United States Patent

Kido et al.

[11] Patent Number: 5,990,924
[45] Date of Patent: Nov. 23, 1999

[54] IMAGE FORMING APPARATUS

[75] Inventors: Eiichi Kido, Yamatokoriyama; Yuhi Yui, Nabari; Shigeyuki Wakada, Yamatokoriyama; Toshihide Ohgoshi, Nara; Satoshi Murakami, Yamatokoriyama; Takahiro Kawakami, Ikoma, all of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/895,115

[22] Filed: Jul. 16, 1997

[30] Foreign Application Priority Data

Oct. 16, 1996 [JP] Japan ................... 8-272779

[51] Int. Cl.$^6$ .................................. H04N 1/40
[52] U.S. Cl. ................ 347/254; 347/240; 347/251; 347/131; 358/298; 358/459
[58] Field of Search ................... 347/131, 240, 347/251, 254; 358/298, 300, 428, 445, 448, 459

[56] References Cited

U.S. PATENT DOCUMENTS

| | | | |
|---|---|---|---|
| 5,005,139 | 4/1991 | Tung | 395/101 |
| 5,627,651 | 5/1997 | Seto et al. | 358/298 |
| 5,662,213 | 9/1997 | Ohshita et al. | 358/448 |
| 5,742,317 | 4/1998 | Kashihara | 347/131 |
| 5,767,982 | 6/1998 | Takahashi et al. | 358/300 |

*Primary Examiner*—John Barlow
*Assistant Examiner*—Hai C. Pham
*Attorney, Agent, or Firm*—David G. Conlin; Richard E. Gamache

[57] ABSTRACT

For input image data ('A') before conversion, each pixel is converted into N (=3) parts. In this case, the three sub-pixels of data corresponding to a recording pixel (black pixel) are converted into recording sub-pixels on both sides of the three ('B'). This eliminates the density variation within a single pixel. Therefore, it is possible to reduce the dot spacing at slanted area, for example, and hence eliminate jaggies, providing a reproduced image easily recognized.

8 Claims, 12 Drawing Sheets

IMAGE FORMING APPARATUS

BACKGROUND OF THE INVENTION (1) Field of the Invention

The present invention relates to an image forming apparatus using an electrophotographic process or the like, such as a copier, printer, facsimile machine, etc., in particular, relating to a technique for converting the resolution of the image in the image forming apparatus and a method for improving the practical resolution hence to make the reproduced image more distinct.

(2) Description of the Prior Art

In image forming apparatuses, typically, using an electrophotographic process, the surface of the photoreceptor as a recording medium is irradiated with light in accordance with an image to be formed. Static charge on the surface of the photoreceptor which has been previously uniformly electrified is discharged from the areas which are irradiated with light, thus the remaining charge forms a static latent image. This static latent image is visualized with toner as the coloring matter, forming a toner image, which in turn, is transferred to a properly fed, sheet-like transfer material, etc. This transfer material is made to pass through the fixing unit so that the toner image carried thereon may be permanently retained on the transfer material, and then this is discharged from the image forming apparatus.

As the means for radiating the light image onto the photoreceptor in accordance with an image to be formed, a semiconductor laser or the like, which is controlled as to its light radiation in accordance with the image information, is used so that the light beam illuminates the surface of the photoreceptor with an image to be formed. Accordingly, the light image formed by the light beam in accordance with the image information is made up of selected pixels.

In such an configuration, no problem occurs in creating an image if the input image information is composed of simple horizontal and/or vertical lines. However, when an image containing slanted lines etc. needs to be created, pixel spacing and jaggies are formed causing degradation. To deal with this, in order to eliminate jaggies and the like, conventionally it is checked whether the edges of image elements are inclined, and if an image element has an inclined portion, the pixels are interpolated or modified in their shape to eliminate the jaggies etc. to the eye, improving the practical resolution.

For example, it is disclosed in the specification of U.S. Pat. No. 5,005,139, that jaggies etc., at image edges or slanted portions are adapted to be eliminated by checking whether the edges of the input image are formed of slanted lines and curved lines and then the dots of recording pixels within the detected portions are changed in size, by adding extra dots or by deleting some dots to thereby eliminate jaggies etc., at the image edges and slanted portions.

In accordance with the above U.S. Patent disclosure, jaggies at the image edges, etc., can be eliminated by checking edges or curved lines (including slanted lines etc.) in the image information of pictorial images and text images etc., recognizing the pixel arrangement of the peripheral pixels, those to the top, bottom, left and right of the detected area, judging the balance of the image based on the pixel arrangement and modifying the size and shape of the recording pixels of the detected area, thus smoothening the image. Therefore, the reproduced image will be improved, being practically equivalent to that produced by a high-resolution process, thus providing more markedly clear and distinct images.

However, in accordance with the technique of the U.S. patent publication, it is necessary to provide a means for detecting edges and curved lines in the image as well as providing a plurality of storage (a plurality of registers etc.,) in order to refer the pixel arrangement of the peripheral pixels around the observed pixel as a recording target. Further, in order to recognize the condition of the peripheral pixels held in the storage, a reference pattern storage or the like for previously holding a large number of reference states of the peripheral pixels is needed. Thus, the circuit configurations unavoidably become very complicated. Moreover, an increased processing time for recognizing edges etc., in the image, inclusive of the processing time for comparing the detected pattern with a large number of reference patterns, is needed, resulting in an impossibility to perform high-speed processing.

As stated above, in order to recognize the peripheral conditions, i.e., those to the top, bottom, left and right of the observed pixel, it is necessary to provide a storage of high capacity for a buffer for temporarily storing the input image information and the memory for storing a large number of reference patterns, increasing the cost over and above that of the complicated circuit configurations.

There is another technique which simply divides each pixel of the image information into a prescribed number of parts. Even in such a case, it is impossible to eliminate jaggies etc., by dividing the pixels. Therefore, when the sub-pixels (the divided pixels) are made black or white, the conditions of the upper, lower, left and right pixels around the observed pixel are checked in the same manner as above. Therefore, this case also results in complicated circuit configurations.

SUMMARY OF THE INVENTION

It is therefore an object of the present invention to provide an image forming apparatus which has a markedly simple circuit configuration and which, without checking the surrounding conditions of the recording pixel, can produce an image equivalent to that obtained by subjecting an image for reproduction to a high resolution process.

It is another object of the invention to provide an image forming apparatus which, by simply checking the left to right relationship of the observed pixel as a recording pixel, enables a high-resolution process and can prevent the image from being thinned or degraded.

The present invention has been achieved to attain the above objects, and the gist of the invention is as follows:

In accordance with the first aspect of the invention, an image forming apparatus for reproducing an image on a recording medium in accordance with input image information by selective irradiation with light beams in accordance with the input image information, includes:

a resolution converting means which, when at least the observed pixel as a recording target is black, converts the resolution of the image into N-times (N is an integer equal to or above 3); and a means for radiating light beams so that at least both sides of the N-divided sub-pixels which were created by N-dividing the recording pixel by the resolution converting means are outputted as black dots.

In accordance with the second aspect of the invention, an image forming apparatus has the above first feature and is constructed such that the resolution converting means makes the resolution of each pixel in the image information N-times that of the original (N is an integer equal to or above 3) only in the main scan direction of the light beam.

In accordance with the third aspect of the invention, an image forming apparatus includes:

a first storage means for holding a prescribed number of pixels of the input image information, in a sequentially shifting manner;

a second storage means which previously has had stored a plurality of reference patterns to be used for identifying the pattern of the image information held in the first storage means;

a comparing circuit for comparing the image information held in the first storage means with the image information and reference patterns stored in the second storage means to identify the pattern of the image information in the first storage means;

an outputting means which previously has had stored a plurality of sub-pixel patterns having N-times the original image resolution (N is an integer equal to or above 3) for the observed pixel as a recording target, and outputting one specific sub-pixel pattern in accordance with the content in the first storage means, based on the comparison result in the comparing circuit; and a beam controlling means for controlling beam exposure in accordance with the sub-pixel pattern information outputted from the outputting means, and is characterized in that the outputting means outputs a sub-pixel pattern having a black sub-pixel at least at the center of the divided pixel, when in the image information held in the first storage means, the observed pixel as the recording target is black and two or more black pixels in a row adjoining the observed black pixel on one side thereof and two or more white pixels in a row adjoining the recording pixel on the other side thereof.

In accordance with the fourth aspect of the invention, an image forming apparatus has the above third feature and is constructed such that the outputting means outputs a sub-pixel pattern having at least two black sub-pixels on the right side, when in the image information held in the first storage means, the observed pixel as the recording target is white and two or more black pixels in a row adjoining the observed black pixel on one side thereof and two or more white pixels in a row adjoining the recording pixel on the other side thereof.

In accordance with the fifth aspect of the invention, an image forming apparatus has the above third feature and is constructed such that the process of replacing the observed pixel into a sub-pixel pattern is implemented in accordance with pixel division instructions given by the operator.

In accordance with the sixth aspect of the invention, an image forming apparatus has the above fourth feature and is constructed such that the process of replacing the observed pixel into a sub-pixel pattern is implemented in accordance with pixel division instructions given by the operator.

In accordance with the seventh aspect of the invention, an image forming apparatus has the above third feature and is constructed such that, when in the image information held in the first storage means, the observed pixel as the recording target is black and one or more black pixels adjoining the observed black pixel on one side thereof and one or more white pixels and two black pixels in a row adjoining the observed pixel on the other side thereof, the outputting means outputs a sub-pixel pattern having only a black sub-pixel at the center of the sub-pixels for the observed pixel, or outputs a sub-pixel pattern having only a black sub-pixel at the center for the black observed pixel as the recording target as well as at least nearest black pixel of the two black pixels adjoining the white pixel.

In accordance with the eighth aspect of the invention, an image forming apparatus has the above third feature and is constructed such that the outputting means outputs a sub-pixel pattern with all black sub-pixels when in the image information held in the first storage means, the observed pixel as the recording target is black and two or more white pixels in a row adjoining the observed black pixel on one side thereof and two or more white pixels in a row adjoining the black pixel on the other side thereof.

The operation of the image forming apparatus of the invention thus configured will be briefly described hereinbelow, with reference to the drawings described later.

First, in the 1st configuration, when a pixel to be recorded is black, the pixel is merely converted into N parts, e.g. three parts, two black sub-pixels on both sides of a white sub-pixel in between. Only this replacement improves the state of the dot forming one pixel. For example, in FIGS. 1A and 1B, a black pixel to be recorded after the conversion is outputted as a sub-pixel pattern of three sub-pixels, and this pattern is reproduced.

Next, in the 2nd configuration, the image resolution of each pixel of image information is merely converted into N times the original resolution (N is an integer equal to or above 3) with respect to the main scan direction of the light beam. For example, black pixels are formed with a reduced spacing distance in FIG. 13B as compared to that shown by the arrow in FIG. 13A. Therefore, slanted lines look good and distinct.

In accordance with the 3rd configuration, when, for example, the image information stored in the first storage means is found to match the reference pattern shown in FIG. 6B, the observed pixel as a recording target, if it is black as shown in FIGS. 7A–7C, is converted into a sub-pixel pattern of three parts, two white sub-pixels on both sides of a black sub-pixel at the center thereof, as shown in 'B'. This sub-pixel pattern is outputted so as to reproduce the observed pixel.

In accordance with the 4th configuration, when the image information stored in the first storage means is found to match the reference pattern shown in FIG. 6A, the observed pixel, even if it is white as shown in FIGS. 8A–8C, is converted into a sub-pixel pattern of three parts, two black sub-pixels as shown in 'B'. This sub-pixel pattern is outputted so as to reproduce the observed pixel.

As described heretofore, since a simplified pattern comparison method is used, it is possible to markedly reduce the storage capacity and also it is possible to reduce the time for comparison and hence achieve high-speed processing.

Next, in accordance with the 5th and 6th configurations, the processing of dividing the observed pixel into sub-pixel pattern is selectively implemented in accordance with the division instructions given by the operator. As a result, it is possible for the operator to optionally select one of the processing schemes shown in, for example, FIGS. 7A–7C or FIGS. 8A–8C.

In accordance with the 7th configuration, when, for example, the input is an image shown in FIG. 9A or 9B, the observed pixel is converted into a sub-pixel pattern of three parts shown in 'B' in FIGS. 10A–10C. Therefore, it is possible to prevent isolated white pixels surrounded by black pixels from being thinned or eliminated.

Finally, in accordance with the 8th configuration, when the input is an image shown in FIG. 11A or 11B, the observed pixel is converted into a sub-pixel pattern of all three black sub-pixels as shown in 'B' in FIG. 12. Therefore, it is possible to effectively prevent isolated black pixels surrounded by white pixels from being thinned or eliminated.

BRIEF DESCRIPTION OF THE DRAWINGS

FIG. 13A is a chart showing a reproduced image according to a conventional process and FIG. 13B is a chart showing a reproduced image according to the process of the invention.

DESCRIPTION OF THE PREFERRED EMBODIMENTS

Figure 1A:
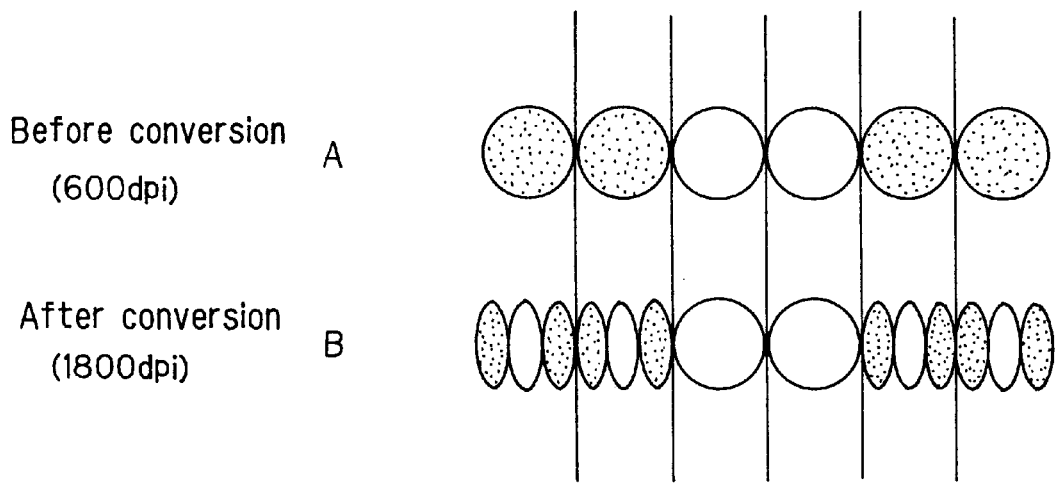
FIGS. 1A and 1B are illustrations for explaining the first embodiment of the invention, showing the output states of the input image data which is divided into N(=3) parts.
Figure 1B:
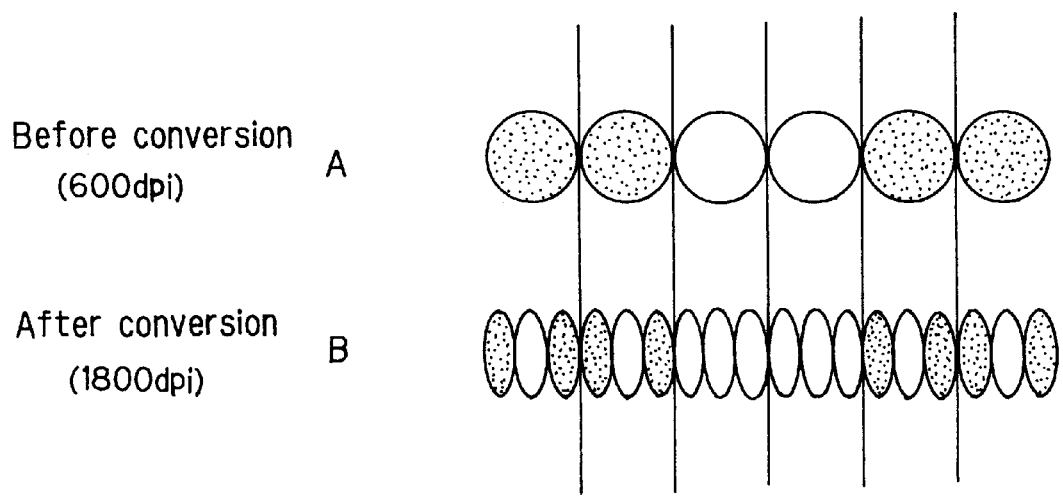
Figure 2:
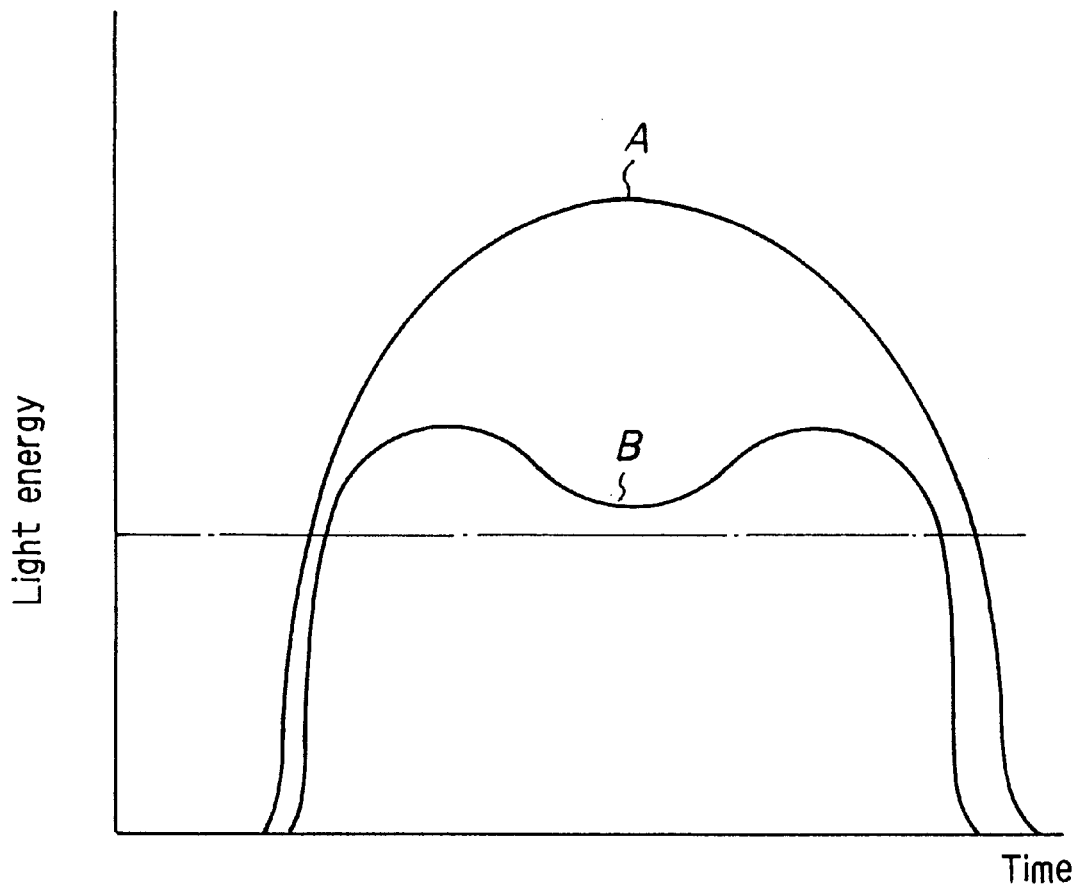
FIG. 2 is a characteristic chart showing the effect of the light energy distribution in the processes in FIGS. 1A and 1B.
Figure 2:
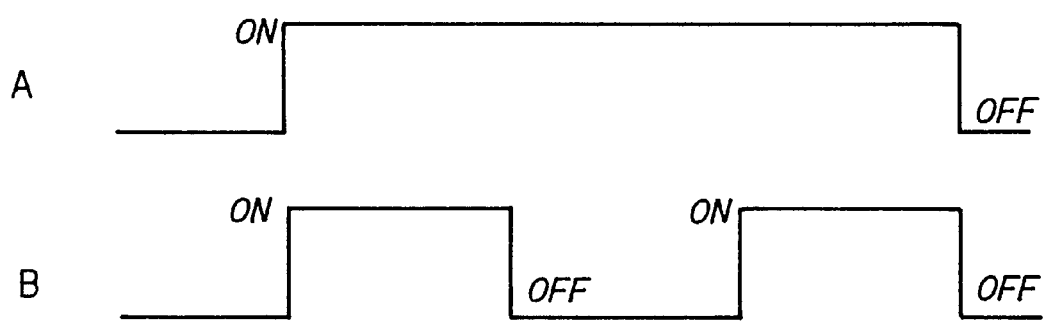
Figure 3:
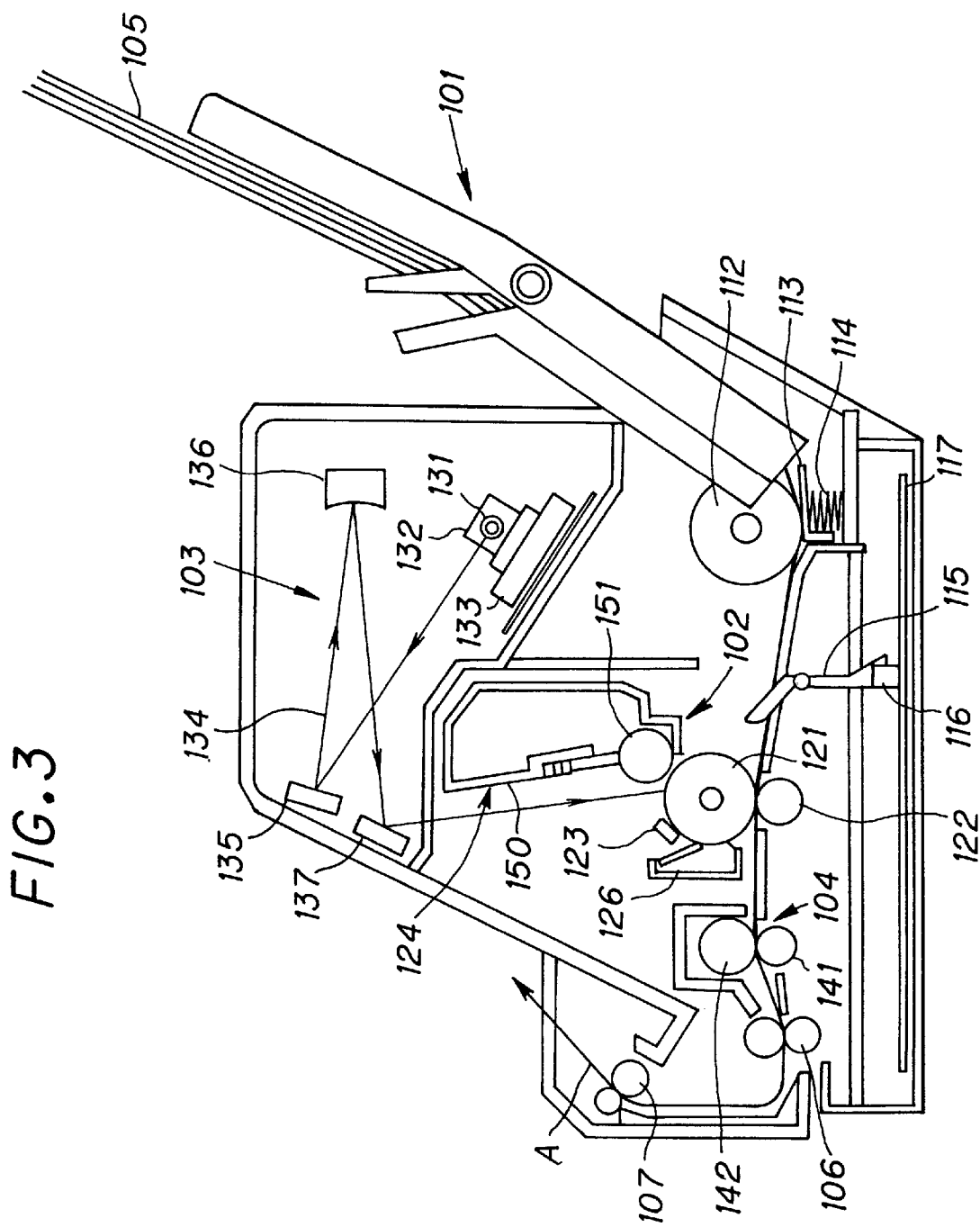
FIG. 3 is a sectional view showing an overall configuration of a laser printer, as an example of the image forming apparatus of the invention.

FIGS. 1A and 1B show a state of image formation in accordance with the first embodiment of the invention. In particular, they are diagrams for illustrating the modes of division recording. FIG. 2 shows a characteristic chart showing a conventional distribution of light energy and a distribution of light energy in accordance with the division recording of the invention. FIG. 3 is a sectional view showing the overall configuration of a compact laser printer as an example of an image forming apparatus.

First, the configuration of an image forming apparatus will be illustrated in reference to FIG. 3. The image forming apparatus, i.e., a laser printer has a paper feeder 101, an image forming portion 102, a laser scanner 103 and a fixing unit 104. Paper feeder 101 feeds a sheet 105 to image forming portion 102 inside the printer.

Image forming portion 102 includes a developing unit 124 which makes the toner develop the static latent image formed on the surface of a drum-shaped photoreceptor 121 as the recording medium, in accordance with the light image illuminated by laser scanner 103, and a means for transferring the toner image formed on the photoreceptor to the sheet 105 being conveyed.

Fixing unit 104 is to fix the unfixed toner image formed on the sheet in image forming portion 102, onto sheet 105 as a permanent image and performs the fixing process while conveying the sheet 105 delivered from image forming portion 102. Then, sheet 105 is discharged by means of conveyer rollers 106 and 107 outside the printer. Briefly, sheet 105 travels through a path shown by a bold arrow A in the figure.

In response to print instructions, sheets 105 stacked on paper feeder 101, are supplied sheet by sheet by the actions of feed roller 112, sheet separation frictional plate 113 and a pressure spring 114 toward the printer interior. When the fed sheet 105 pushes over a sheet detection actuator 115, a sheet detection optical sensor 116 outputs an electric signal based on this information to instruct the start of image print.

A control circuit 117, which is activated by the operation of sheet detection actuator 115 and will be described later, sends out a signal which has been obtained by processing the input information, to a laser diode light emitting unit 131 to perform on/off control of the light emitting diode.

A scanning mirror 132 is uniformly driven at a high speed by means of a scanning mirror motor 133. Therefore, laser beam 134 scans photoreceptor 121 along its axial direction. Laser beam 134 emitted from laser diode light emitting unit 131 passes through reflection mirrors 135, 136 and 137 to be radiated onto photoreceptor 121 as a component of image forming portion 102. During this, laser beam 134 selectively illuminates the surface of photoreceptor 121 in accordance with the on/off information from the aforementioned control circuit 117.

As a result, this laser beam 134 selectively discharges the static charge on the surface of the photoreceptor which has been previously electrified by means of a charger 123, thus a static latent image is formed on photoreceptor 121. On the other hand, the toner to be used for the development is stored in a developing unit 150 in developing apparatus 124. The toner which has been appropriately agitated and triboelectrified in developing unit 150 adheres onto the surface of a developing roller 151. The action of an electric field generated by a developing bias voltage applied to developer roller 151 and the surface potential of the photoreceptor causes the toner to adhere to the static latent image formed on the surface of photoreceptor 121, thus the latent image is visualized.

The sheet 105 fed from paper feeder 101 into image forming portion 102 is held between photoreceptor 121 and a transfer roller 122 and conveyed thereby. The toner image on photoreceptor 121 is electrically attracted by the action of a transfer voltage applied to transfer roller 122 so that it transfers to sheet 105. During this process, the toner image on photoreceptor 121 is transferred to sheet 105 by means of transfer roller 122 while untransferred toner becomes waste and is removed from the surface of photoreceptor 121 by a cleaning unit 126 so as to prepare for a subsequent image forming operation.

Thereafter, sheet 105 is conveyed to fixing unit 104, where it is appropriately heated and pressurized by a pressure roller 141 and a heat roller 142 which is kept at a temperature of one hundred and some tens of degrees. As a result, the toner is fused and fixed on sheet 105 forming a stable image. Sheet 105 with toner fixed thereon is conveyed by conveying rollers 106 and 107 and discharged to the outside.

Figure 4:
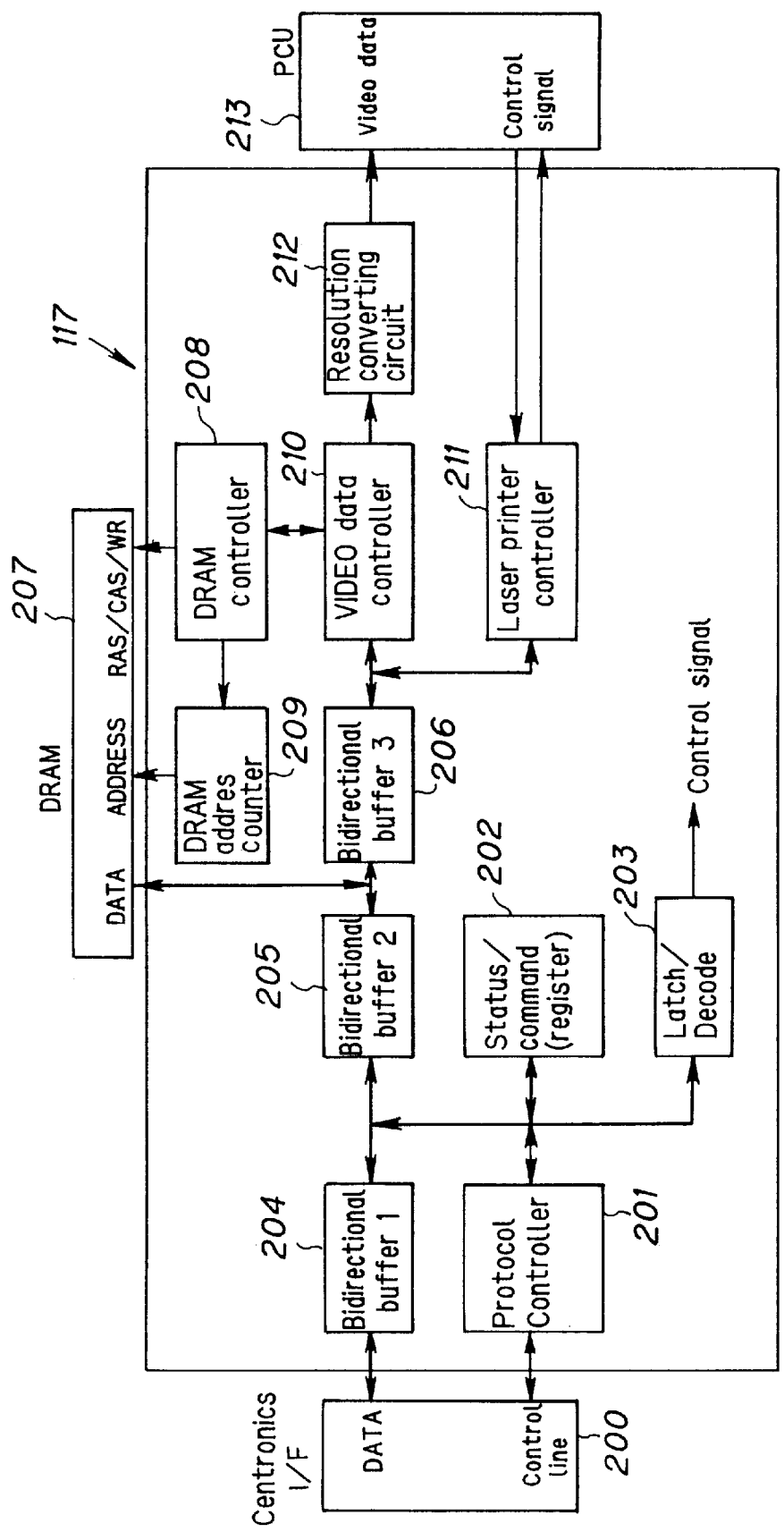
FIG. 4 is a block diagram showing a controlling circuit configuration for controlling the image forming portion of the image forming apparatus shown in FIG. 3.

Referring next to a block diagram shown in FIG. 4, description will be made of control circuit 117 for controlling the aforementioned laser diode light emission unit 131, i.e., the semiconductor laser in accordance with the image information. FIG. 4 is a block diagram of control circuit 117 which receives image information (data) from an unillustrated host computer and controls the image processing and printing process (in image forming portion 102).

In FIG. 4, 200 designates a centro-interface as a bidirectional interface creating connection between the host computer and the printer; 201 a protocol controller for controlling the protocol of interface 200; 202 a register which, in order to transmit command data from the host to the printer portion (image forming portion 102) or transmit status data from the printer portion to the host, temporarily stores these data through the data bus, and can output them as necessary.

Reference numeral 203 designates a latch-decoder which latches direct commands from the host, print start signal, RAM reset signal and the like and sends it out as a control signal to each component.

Reference numeral 204 designates a first bidirectional buffer which temporarily stores the print data sent from the host computer as image information for image reproduction and the status data from the printer portion, until they are sent out to the designated block or the host computer; 205 a second bidirectional buffer which detects the clock data etc. contained in the data received from the host computer, and takes them off and sends the result to the DRAM; and 206 a third bidirectional buffer for temporarily storing data.

Reference numeral 207 designates a DRAM consisting of FIFO for storing the print data to be reproduced at the image forming portion; 208 a DRAM controller for controlling access (including write and read) to DRAM 207 and to the register of the video data controller 210 etc.; 209 a DRAM address counter for controlling DRAM 207; 210 a video data controller which decompresses (restores) the compressed data sent from DRAM 207, back to the original image data (print data) for reproduction and transfers the data to image forming portion 102 in synchronization with the operation of the image forming portion 102; and 211 a laser printer controller which transfers data from the host computer to the image forming apparatus body and also transfers the printer status from the printer to the host computer.

Reference numeral 212 designates a resolution converting circuit which converts the print data for a reproduced image received from the host computer in the invention, into 3x-resolution data and replaces the image data for reproduction into prescribed patterns.

Reference numeral 213 designates a PCU (process control unit) for controlling image forming portion 102.

In the above configuration, the print data (image information/image data to be reproduced) transmitted from the host computer is received by the image forming apparatus (laser printer) through centro-interface 200. The print data is temporarily stored in bidirectional buffer 204, and then is transferred to second bidirectional buffer 205, where the clock data etc. contained in the transmitted data is detected and removed therefrom, and the resultant is stored in DRAM 207. In response to the instructions from video data controller 210, the print data thus stored is transferred to video data controller 210 via third bidirectional buffer 206. In video data controller 210, the compressed data is decompressed and this is transferred in synchronization with the operation of the image forming portion 102 to the PCU (in the image forming portion 102) via an aftermentioned resolution converting circuit 212 so that the recording operation is implemented.

Figure 5:
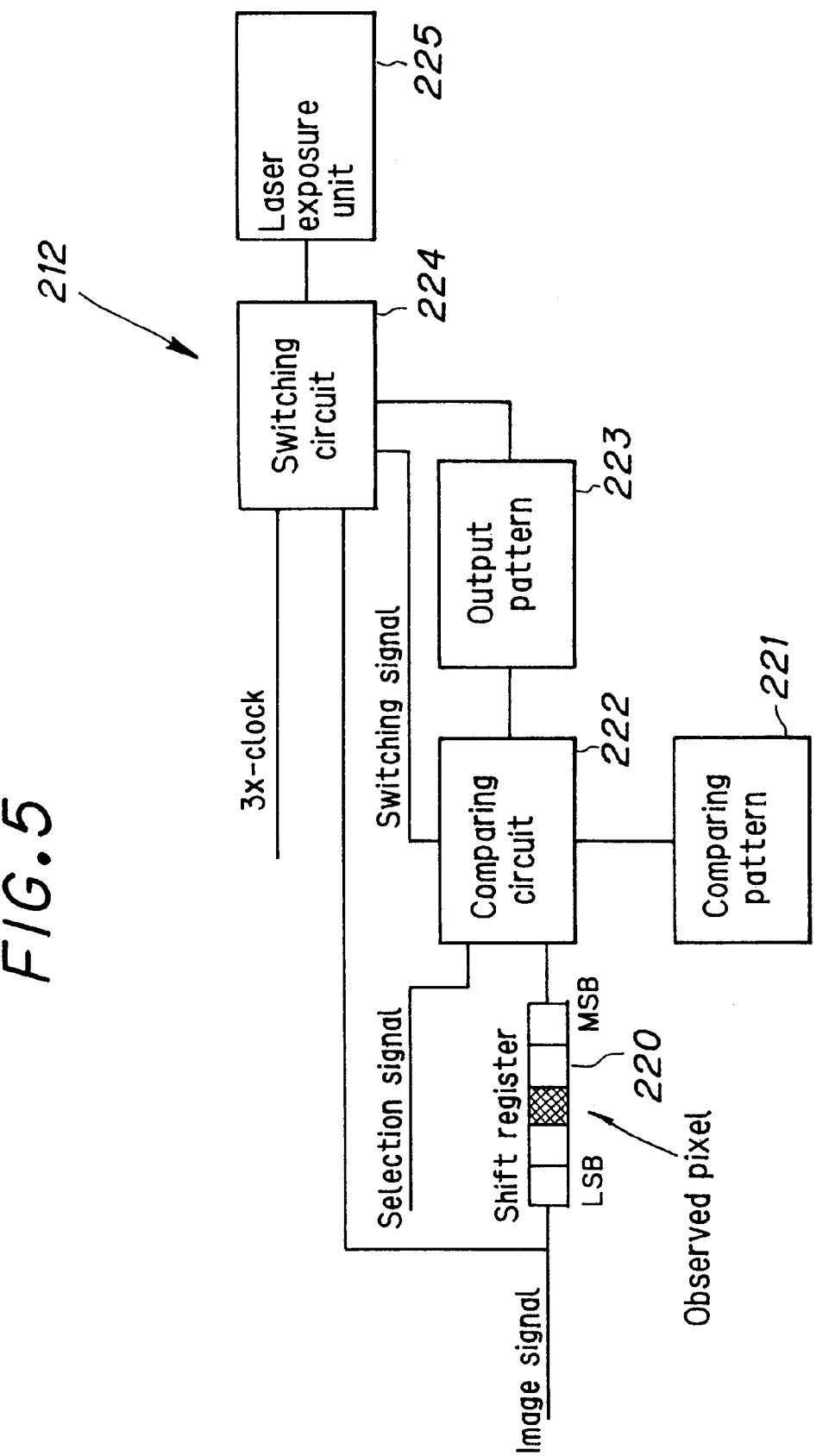
FIG. 5 is a block diagram showing in detail a converting processing circuit of FIG. 4 for implementing a resolution converting process of the invention.

FIG. 5 is a block diagram showing in detail the above resolution converting circuit 212 in the invention. In this figure, 220 designates a shift register made up of 5 bits or 6 bits for sequentially shifting the print data of, e.g., 600 dpi, transferred from the host computer, or in particular the image data for reproduction processed through control circuit 117 in FIG. 4, bit by bit and storing them therein.

This shift register 220 is made up of 5 bits in this figure. Sequentially, one of the data bits in this register is set and processed as an observed pixel as the recording target. In this invention, the observed pixel as the recording target may be converted into three parts so that the resultant image will have a 3x-resolution.

Reference numeral 221 designates a comparing pattern storage which previously has had stored reference patterns each made up of plural pieces of bit data to be compared to the bit data stored in shift register 220; 222 a comparing circuit which compares the bit data in shift register 220 with the reference patterns in the comparing pattern storage and the image information stored in this shift register 220 therewith; and 223 a pattern outputting portion which, according to the invention, previously has had stored a plurality of sub-pixel patterns and when the image information stored in shift register 220, which matches one of the reference patterns, is received from comparing circuit 222, it outputs a predetermined sub-pixel pattern for converting the observed pixel in shift register 220 into 3x-resolution data (1800 dpi).

The above comparing circuit 222, compares the bit data (image information) stored in shift register 220 with a plurality of the reference patterns stored in comparing pattern storage 221. When there is a matching pattern, a switching signal is sent out while the information for outputting a sub-pixel pattern, corresponding to the matching pattern, which is converted into 1800 dpi is sent to pattern outputting portion 223. Pattern outputting portion 223 stores plural pieces of sub-pixel pattern data each corresponding to a respective reference pattern in which each pixel is divided into three parts and outputs one of the sub-pixel patterns when receiving the matching pattern from comparing circuit 222.

Designated at 224 is a switching circuit which is supplied with print data of, e.g., 600 dpi, sent from the host computer, a 3x-clock signal for 1,800 dpi, print data from pattern outputting portion 223, and if it receives the print data outputted from pattern outputting portion 223 in synchronization with the switching signal from comparing circuit 222, outputs the print data, and if it does not detect the switching signal, converts the input image signal into a prescribed pattern based on the 3x-clock signal and outputs the resultant data.

Reference numeral 225 designates a laser exposure unit comprised of a laser beam emitting unit 131, and turns on and off the semiconductor laser in accordance with the print data from switching circuit 224.

In this arrangement, when data of 600 dpi is transferred to resolution converting circuit 212 from VIDEO data controller 210, the print data is temporarily stored into shift register 220 in the order it was transferred. As for the data stored in shift register 220, comparing circuit 222 recognizes one particular bit at an image or character edge or one prescribed bit in particular bit arrangement, and searches for a matching pattern from plural reference patterns stored in comparing pattern storage 221, checking the arrangement of the bits (MSB) above the observed pixel and the arrangement of the bits (LSB) below the observed pixel.

The selection signal inputted to comparing circuit 222 is contained in the status signal received from the host computer and designates, in accordance with the operator's instructions, whether a smoothing process of text and pictorial images is to be implemented, whether or not a single dot emphasis process is to be performed, and how they should be implemented. This will be described later.

When the implementation of a smoothing process of text and pictorial images and a single dot emphasis process is designated by the selection signal, if the bit data in shift register 220 is found to match one of the reference patterns in comparing pattern storage 221, the switching signal is made active and a prescribed piece of print data made up of 1800 dpi is outputted based on the requirements designated by the retrieved data and the selection signal.

When the default of a smoothing process of text and pictorial images and a single dot emphasis process is designated by the selection signal, or if no matching pattern with the bit data in shift register 220 can be retrieved from comparing pattern storage 221, the switching signal remains non-active so that switching circuit 224, based on the image signal and the 3x-clock signal, converts each of the recording pixels(e.g., black pixel) of 600 dpi into three sub-pixels of black, white and black dots forming image data having a practical resolution of 1800 dpi.

Switching circuit 224, in accordance with the switching signal outputted from comparing circuit 222, switches its output between the print data from pattern outputting portion 223 and that obtained by replacing the image data with a prescribed print pattern on the basis of the image signal and the 3x-clock signal, thus making it possible to select a recording and reproducing scheme in accordance with the operator's preference.

(1st embodiment)

Now, in order to understand each process in the above circuit configuration more clearly, sequential procedures for creating an output pattern will be described by showing a practical converting process of the image data for reproduction to be inputted to the image forming apparatus, i.e., a printer.

FIGS. 1A and 1B are diagrams for explaining the basic operation in converting the resolution of the image information inputted from the host computer, in particular showing a case where the resolution with respect to the main scan direction of the laser beam is converted into a 3x-resolution (N=3). In FIG. 1A, 'A' designates the image information made of, for example, 600 dpi, inputted from the host computer, or the image information before the conversion of the invention.

A dot arrangement 'B' in FIG. 1A shows a converted pattern in which recording pixels (black pixels in this case) in the image data inputted from the host computer are converted by comparing circuit 222 shown in FIG. 5, into sub-pixels of 1800 dpi with respect to the main scan direction. Specifically, when the observed pixel (one pixel) to be recorded is black, it is divided into three parts forming an image signal having a practical resolution of 1800 dpi. In particular, the sub-pixel pattern shown is constructed such that a single black pixel is converted into two black sub-pixels on both sides of a white sub-pixel in between, or black, white and black sub-pixels.

As in 'A' in FIG. 1A, 'A' in FIG. 1B designates the image information made of, for example, 600 dpi, inputted from the host computer, before conversion. A dot arrangement 'B' in FIG. 1B shows a converted pattern in which, for all the pixels in the image data inputted from the host computer, not only recording pixels but also including non-recording pixels, are converted by comparing circuit 222 shown in FIG. 5, into sub-pixels of 1800 dpi with respect to the main scan direction. Specifically, a recording pixel is divided into three parts, forming a piece of image data having a resolution of 1800 dpi, and is converted into two recording (black) sub-pixels on both sides of a non-recording (white) sub-pixel in between, or black, white and black sub-pixels. Further, the non-printing pixel (white), is also divided into three parts, forming image data having a resolution of 1800 dpi. In this case, the non-recording pixel is converted into a sub-pixel pattern of white, white and white sub-pixels.

In the recording process shown in FIG. 1A, since only the recording pixels (black) of the image information inputted from the host computer are converted, high-speed conversion can be performed. In particular, without any checking by comparing circuit 222, etc., the recording pixels (e.g. black pixels) are all divided into three sub-pixels and this is outputted from pattern outputting portion 223. Accordingly, since, when the observed pixel in shift register 220 is a recording (black) one, the output processing is performed by pattern outputting portion 223, it is possible to improve the processing speed.

In the recording process shown in FIG. 1B, the actual recording state is the same as in FIG. 1A, but all the image data inputted from the host computer is converted under the same conditions, the process can be simplified because no switching control of clock signals etc. is needed.

FIG. 2 shows distribution of light energy of the laser beam for one recording target pixel (e.g., black) of this embodiment in comparison with the conventional one. As compared to the light energy distribution when the semiconductor laser is driven based on clock A, the light energy distribution when the semiconductor laser is driven based on clock B is somewhat lower in the middle part thereof. However, this gives a more uniform distribution as a whole for recording a single pixel, so that adherence of toner becomes uniform so as to provide a pixel having a uniform density. In this respect, the light energy distribution A for the conventional configuration, will form a pixel having a higher toner density at the center and lower toner density in the peripheral part thereof, resulting in a blurred dot. In the figure, the chain line indicates the area where toner adheres, that is, the light energy above the line will bear the toner.

As is understood from FIG. 2, since one recording pixel to be reproduced can be made uniform in density, by dividing one single pixel into three parts, it is possible to reproduce a clear dot or pixel without any blur.

Figure 13A:
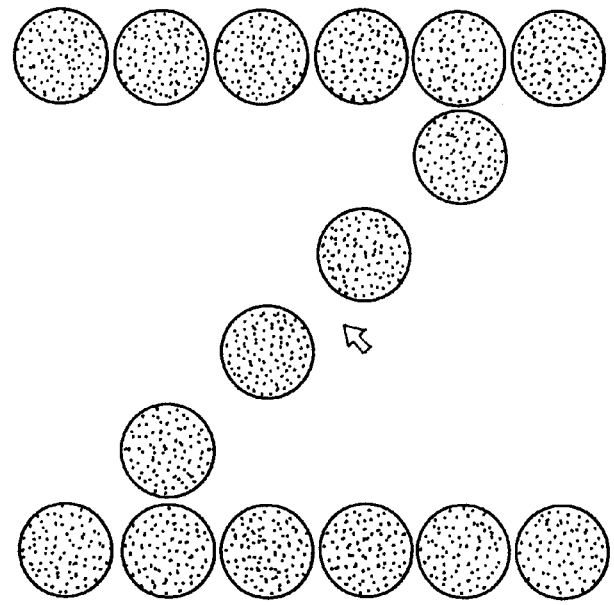
FIGS. 13A and 13B are chart showing reproduced states of a character 'Z' by the first embodiment of the invention and by conventional processing.
Figure 13B:
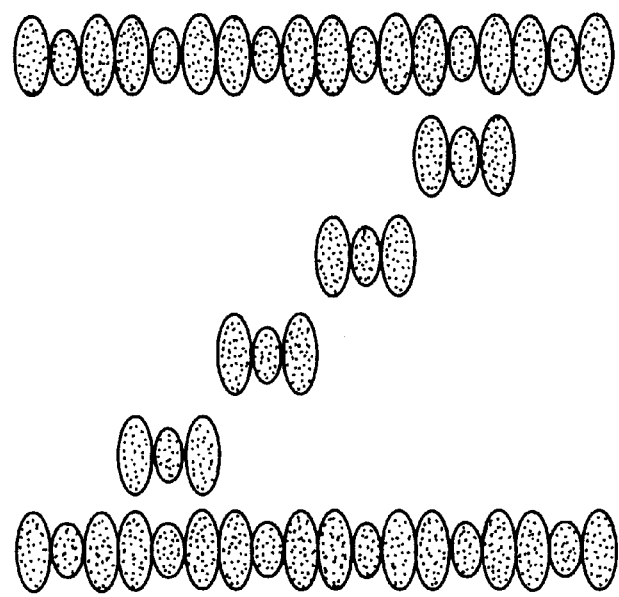

FIGS. 13A and 13B show reproduction results of a character 'Z'. FIG. 13A shows a recording result in which the image data is reproduced based on the conventional scheme, at a resolution of 600 dpi, for example.

FIG. 13B shows a recording result in which the image data is reproduced based on the above scheme of the first embodiment of the invention. Here, in the recording result of this invention, each center of the three sub-pixels is shown with a smaller dot. This represents the lowering at the center of the light energy distribution shown in FIG. 2. Because the longitudinal energy level in the upper and lower edges in the center sub-pixel also lowers, the toner only adheres to the area at the central part of the center sub-pixel. This situation is schematically shown in this figure.

In FIG. 13A, in the slanted portion of the character 'Z', the spacing distance between the recording pixels (dots) is wide as shown by the arrow. On the other hand, in accordance with the invention, the spacing distance is made narrower as shown in FIG. 13B. Therefore, the reproduced image becomes more easily recognized.

(2nd embodiment)

Referring next to FIGS. 6A and 6B, FIGS. 7A–7C to FIGS. 9A and 9B, the second embodiment will be described. In the above first embodiment, pixels to be recorded (black or white pixels) are all divided into three parts, and the semiconductor laser is controlled to record the sub-pixels on the both sides of the three.

In contrast, in this second embodiment, the neighboring pixels, those to the left and right (in the rasterizing direction/ along the main scan direction of the laser) around the observed pixel as a recording target are checked and in accordance with the states of these pixels, the pattern of the three divided parts is controlled so as to effectively eliminate jaggies etc., thus performing a smoothing process. In particular, the process of the invention is adapted to be implemented for pictorial images or characters at their left and right edges, by checking the state of conversion of the recording image.

Figure 6A:
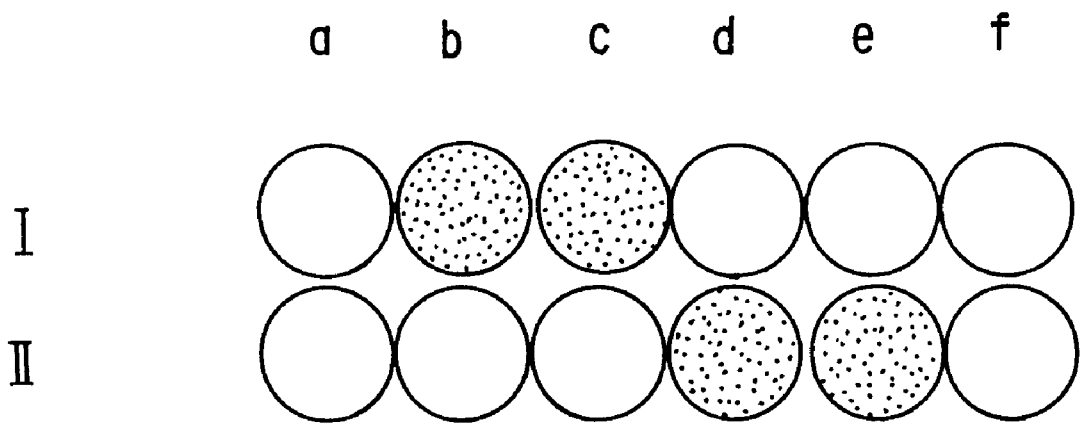
FIGS. 6A and 6B are pattern charts for the second embodiment, explaining examples of the reference patterns stored in the comparing pattern storage in the converting processing circuit shown in FIG. 5.
Figure 6B:
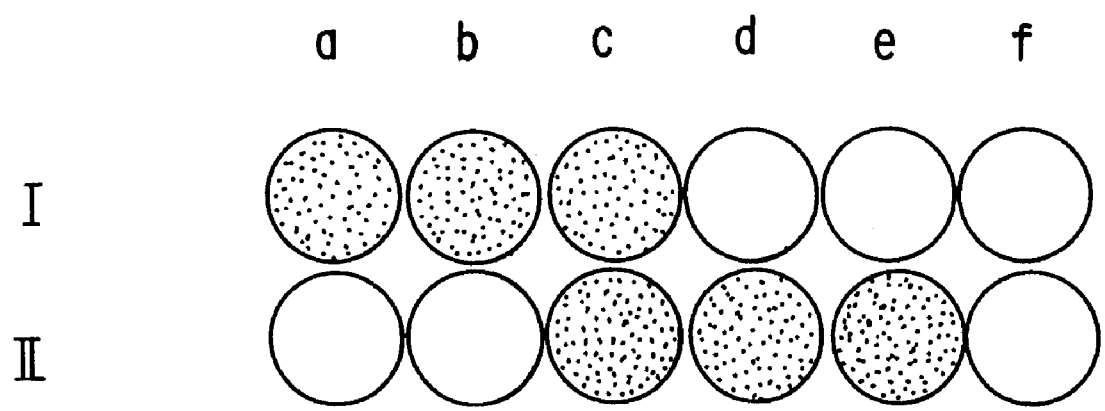

FIGS. 6A and 6B are examples of the reference patterns stored in comparing pattern storage 221. In the figures, pixels a to f are arranged along the main scan direction of the laser beam, and I and II designate the auxiliary direction. In FIG. 6A, row I shows a reference pattern where pixels b and c are black dots while pixels d, e and f are non-recording pixels (white dots) and row II shows a reference pattern where pixels a, b and c are non-recording pixels while pixels d and e are recording pixels (black dots).

In FIG. 6B, row I shows a reference pattern where pixels a, b and c are recording pixels while pixels d, e and the following are non-recording pixels and row II shows a reference pattern where pixels a and b are non-recording pixels while pixels c, d and e are recording pixels.

The patterns on the upper lines (row I) of FIGS. 6A and 6B each are reference patterns having the right edge (black pixel) of an image, and the patterns on the lower lines (row II) each are reference patterns having the left edge (black pixel) of an image.

Figure 7A:
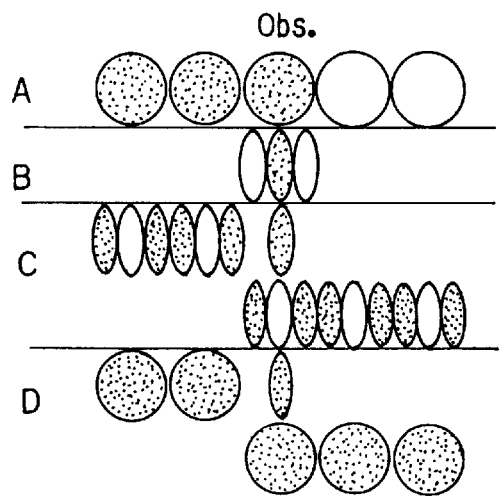
FIGS. 7A–7C are charts showing a converting process when an input is found to match the reference pattern shown in FIGS. 6A and 6B, wherein the input image data, conversion processed data, recording state, the state of recording process are schematically represented.
Figure 7B:
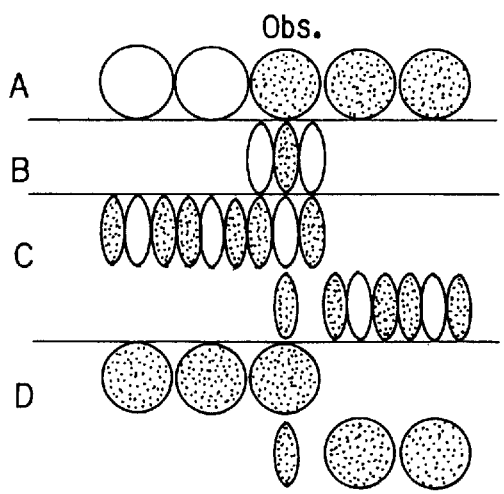
Figure 7C:
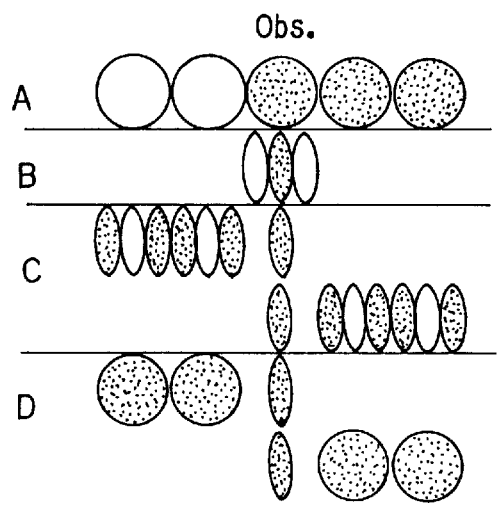

Now, the converting states of the pixels in FIGS. 6A and 6B will be described illustratively. In FIGS. 7A–7C, 'A' shows the image information made of 600 dpi, inputted from the host computer before the conversion. In the figures, the right side is the most significant dot (MSD) inputted first and the left side is the least significant dot (LSD) inputted last, the bit marked with 'Obs.' represents the observed pixel.

In FIG. 7A, two or more dots of the non-recording pixels (white pixels) exist on the MSD side of the observed pixel marked with 'Obs' as the recording target, and at least two dots of the recording pixels (black pixels) exist on the LSD side of the observed pixel. This state is the same reference pattern shown on row I in FIG. 6B. When this image information is inputted to shift register 220 shown in FIG. 5, comparing circuit 222 searches for the same pattern in shift register 220, from the reference patterns stored in comparing pattern storage 221. By this search, if the matching pattern is found, comparing circuit 222 sends the retrieved matching pattern to pattern outputting portion 223, which in turn outputs a sub-pixel pattern of pixels that are divided into three parts, to be described below.

As stated above, in the pattern state shown in 'A' of FIG. 7A, the observed pixel is recognized as the right edge of a recording area because non-recording pixels exist in series on the right side of the recording pixels. Accordingly, in accordance with the retrieved pattern by comparing circuit 222, pattern outputting portion 223 outputs the sub-pixel pattern data shown in 'B'. In particular, for image information of 600 dpi, in the first embodiment, a black pixel is converted into a sub-pixel pattern of black, white and black sub-pixels, and this sub-pixel pattern of data is outputted from switching circuit 224. On the other hand, in this embodiment, when in response to the match with one of the reference patterns in comparing circuit 222, the black pixel is converted into a sub-pixel pattern of white, black and white sub-pixels and this sub-pixel pattern data is outputted from pattern outputting portion 223.

Designated at 'C' in FIG. 7A is a state of the image data converted by the converting circuit. When the image data pattern to be recorded, stored in shift register 220 matches the reference data shown in row I in FIG. 6B, a pattern shown in the upper row will be produced. The lower row in 'C' in FIG. 7A shows a state where the image data shown in row II in FIG. 6B is converted in accordance with the scheme of the first embodiment.

The pattern 'D' in FIG. 7A is a schematic representation of the recorded result obtained from the pattern 'C' in FIG. 7A. In this pattern 'D', a set of three parts represents one recorded pixel. As for the observed pixel, only the center of three parts appears as a recording sub-pixel.

When the data on the image edge (right edge), i.e., the dot designated in row I and column c in FIG. 6B is converted so as to modulate the laser exposure unit 225, the recording is performed as described above. As a result, it is possible to eliminate jaggies at the edge of patterns, characters, etc., and hence smoothen the edges of the output image.

FIG. 7B shows a converting state of a black pixel at the left edge, when the image information (data 'A') of 600 dpi, is inputted from the host computer. In this figure, two or more dots of the recording pixels (black pixels) exist on the MSD side of a black pixel as the observed pixel while at least two dots of the non-recording pixels (white pixels) exist on the LSD side of the observed pixel. When the shift register 220 has this content stored, this matches the reference pattern in row (line) II in FIG. 6B, so that this matching pattern is sent out from comparing circuit 222 to pattern outputting portion 223. In accordance with this state, a three sub-pixel pattern of data for the black pixel at the leftmost black pixel, i.e., the observed pixel, is outputted from pattern outputting portion 223. In this case, a pattern having only a black pixel at the center of the three parts as shown in 'C' of FIG. 7B is outputted as the three sub-pixel pattern data.

The pattern 'C' of FIG. 7B shows a recording state of the image data converted by the converting circuit, and the pattern 'D' is a schematic representation of the recorded result by showing a set of three parts as one recorded pixel dot. In particular, in 'C' of FIG. 7B, the upper line is converted as already described in the first embodiment, whereas the lower line is converted in such a manner that the recording pixel on the left edge, i.e., the dot designated in row II and column c in FIG. 6B is uniquely converted and other recording pixels are converted in the same manner as in the first embodiment. The thus converted recording pixel data is supplied to laser exposure unit 225 for recording, whereby it is possible to eliminate jaggies at the edge of patterns, characters, etc., and hence smoothen the edges of the output image.

FIG. 7C shows a scheme which is the combination of those in FIGS. 7A and 7B described above. That is, this figure shows the case where for both the leftmost and rightmost recording pixels (black pixels), the sub-pixel image data uniquely converted by pattern outputting portion 223 is outputted.

Thus, it is possible to more efficiently eliminate jaggies at the edge of patterns, characters, etc., and hence smoothen the edges of the output image, by combining the converting process of FIG. 7A with that of FIG. 7B, in accordance with the selection of the selection signal shown in FIG. 5.

The above selection signal is chosen by the operator. In other words, the operator can arbitrarily select one of the smoothing processes, i.e., smoothing on the right side of an image, on the left side, or on both sides. In response to the operator's selection, one of the schemes shown in FIGS. 7A through 7C is selected, and this selection signal is inputted to comparing circuit 222. In response to this, comparing circuit 222 compares the pattern in the register with the reference patterns stored in comparing pattern storage 221, so as to perform a matching search operation, based on the selection signal.

Figures 8A, 8B, 8C:
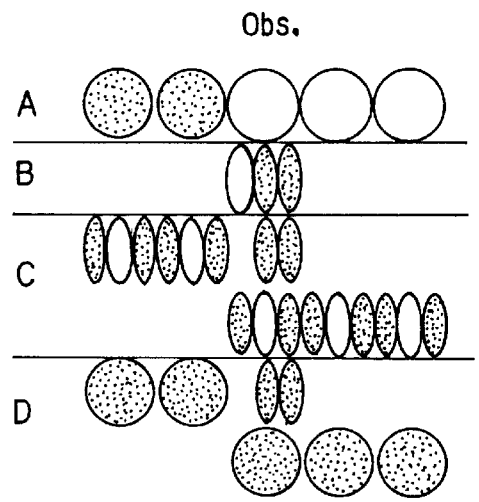
FIGS. 8A–8C are charts showing a different example of a converting process when an input is found to match the reference pattern shown in FIGS. 6A and 6B, from that shown in FIGS. 7A and 7B, wherein the input image data, conversion processed data, recording state, the state of recording process are schematically represented.

In the above description, the converting process using the comparison with the reference pattern shown in FIG. 6B was described. Referring now to FIGS. 8A through 8C, a converting process using the comparison with the reference pattern shown in FIG. 6A will be described.

FIGS. 8A through 8C show different process schemes depending on the conditions selected by the operator, as in FIGS. 7A through 7C, and show respective recording conditions; conditions on the right side, left side, and the case where the two methods are combined. In FIGS. 8A–8C, 'A' shows image information made of 600 dpi, inputted from the host computer; 'B' shows a state where the observed pixel is subjected to a converting process; 'C' shows a state of the image data after the conversion or a recording state thereof; and 'D' shows a state where recording was performed in accordance with the converted data.

As shown in FIG. 8A, the image information 'A' of 600 dpi, inputted from the host computer, has a white pixel as the observed pixel which is a recording target, with two or more white pixels on the MSD side of the observed pixel and at least two dots of black pixels on the LSD side of the observed pixel. This state is identical with the reference pattern in row I of FIG. 6A. If this pattern is stored into shift register 220 shown in FIG. 5, comparing circuit 222 produces the matching output so as to send the matching pattern to pattern outputting portion 223. The pattern outputting portion 223, outputs a sub-pixel pattern of data shown in 'B' in FIG. 8A. In this output state, as shown in 'C' in FIG. 8A, the white pixel as the observed signal is represented by a sub-pixel of data, i.e., the converted recording data having three white (non-recording), black and black sub-pixels.

In FIG. 8A, the recording (black) pixel on the right end of the next line is not designated by the instructions of selection, so that each recording pixel is converted into a sub-pixel pattern of three black, white and black sub-pixels, as described in the first embodiment.

In practice, if there is no reference pattern which matches the data in the register in comparing circuit 222, a recording pixel is converted into three black, white and black sub-pixels of 1800 dpi by means of switching circuit 224. In contrast, when a match is found and hence a matching process is effected in comparing circuit 222, the observed pixel, especially, that of white is converted into three white, black and black sub-pixels. In this manner, it is possible to eliminate jaggies in particular on the right edges of pictorial patterns, characters etc., so as to smoothen the edges of the image.

Next, the process shown in FIG. 8B is the opposite of that in FIG. 8A, that is, this process is to eliminate jaggies etc., on the left edges. As in above figure, the image information 'A' of 600 dpi, inputted from the host computer, has a white pixel as the observed pixel, with two or more black pixels on the MSD side of the observed pixel and at least two dots of white pixels on the LSD side of the observed pixel.

When this image information is stored in shift register 220 of FIG. 5, comparing circuit 222 compares it with the reference patterns stored in comparing pattern storage 221 to search for a matching pattern. The thus retrieved matching pattern is sent to pattern outputting portion 223, which in turn outputs a sub-pixel pattern of data of three parts to be the recording data. This recording data (converted data) to be outputted is composed of white, black and black sub-pixels, as shown in 'B' in FIG. 8B.

If no match was found in comparing circuit 222, the recording pixel is converted into three black, white and black sub-pixels of 1800 dpi and the thus converted data is outputted. In this case, when switching circuit 224 receives no switching signal from comparing circuit 222, the circuit 224 outputs the converted data consisting of black, white and black sub-pixels. In contrast, when comparing circuit 222 finds a match corresponding to the image data shown in 'A' in FIG. 8B, the aforementioned process is effected so that the observed pixel is converted into white, black and black sub-pixels in pattern outputting portion 223.

In the above way, in accordance with matching result (match or mismatch) in comparing circuit 222, the converted data shown in 'C' in FIG. 8B is outputted and recording and reproduction is implemented. The recording in accordance with the converted data shown in 'C' makes it possible to eliminate jaggies on the left edge of pictorial patterns, characters etc., and hence smoothen the edge of the image.

FIG. 8C shows a scheme which is the combination of those in FIGS. 8A and 8B. That is, this figure shows the case where both the left and right edges of an image is subjected to the above converting process. In the schemes shown in FIGS. 8A through 8C, any one of the smoothing processes is implemented in accordance with the selection signal given by the operator as described above. In response to the instructions, it is possible to obtain the reproduced image desired by the operator, and thus it is possible to more efficiently eliminate jaggies at the image edges of pictorial patterns characters, etc., and hence smoothen the image edges.

(3rd embodiment)

The above second embodiment is a converting process for eliminating jaggies at image edges where the image changes from black pixels to white pixels or vice versa. Therefore, it is effective in eliminating jaggies of slanted lines or planes in the image.

This third embodiment is not the one to eliminate jaggies but is to eliminate the occurrence of thinning and failure to be reproduced, etc., in a reproduced image.

Figure 9A:
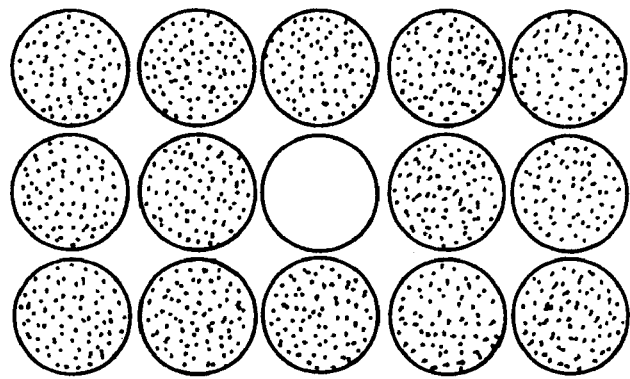
FIGS. 9A and 9B are pattern charts of image data for the third embodiment, explaining other examples of the reference patterns stored in the comparing pattern storage in the converting processing circuit shown in FIG. 5.
Figure 9B:
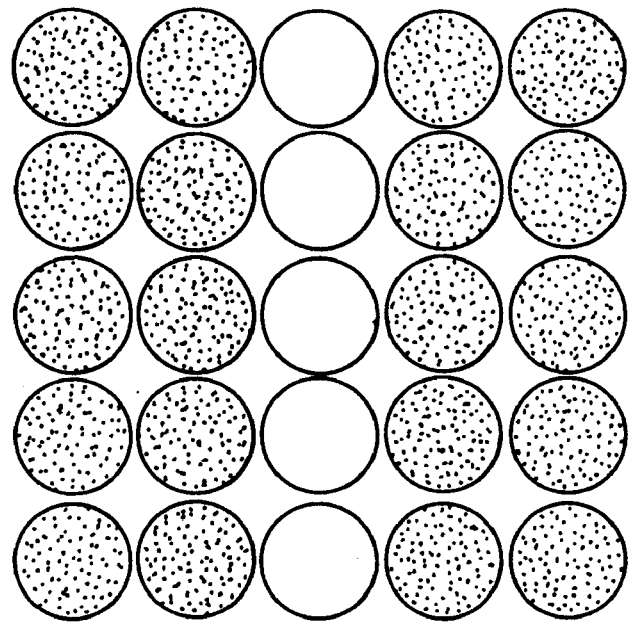

For example, reproduction is implemented in accordance with the image information shown FIG. 9A or 9B, there are cases where non-recording pixels (white pixels) are neglected or become too thin to be recognized. In the case of FIG. 9A where a white pixel is surrounded by black pixels, the white pixel at the center may be eliminated by the reproduction of black pixels. Briefly, the pattern is reduced to a black solid pattern with no visible white pixel at the center. FIG. 9B shows an image of a white line of pixels. In this case, the line of white pixels may become thin or incognizable because of filling.

In order to eliminate problems of this kind, the converting processes in accordance with the above first and second embodiments can be used to obtain an undisrupted, reproduced image from such image data. This conversion method will be explained next.

Figure 10A:
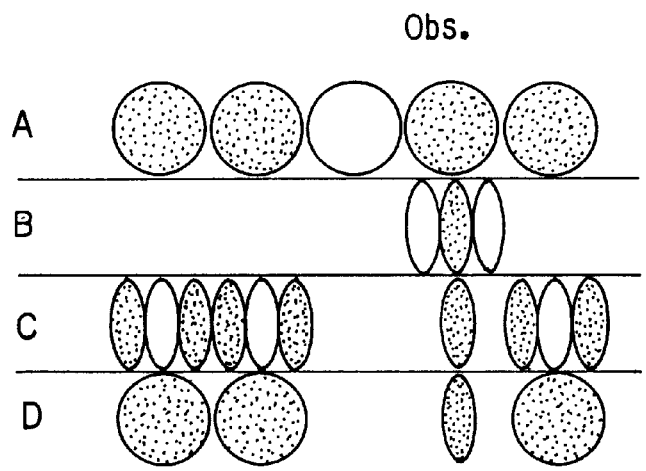
FIGS. 10A–10C are charts showing a converting process when an input is found to match the reference pattern shown in FIGS. 9A and 9B, wherein the input image data, conversion processed data, recording state, the state of recording process are schematically represented.
Figure 10B:
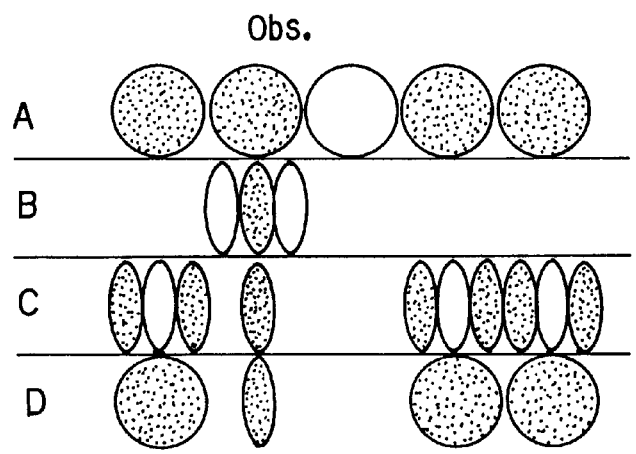
Figure 10C:
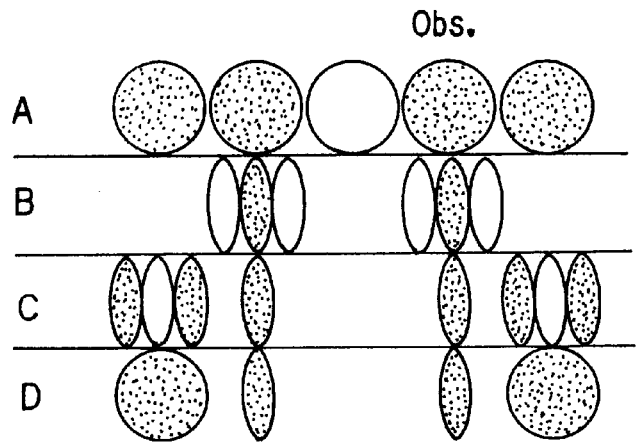

FIGS. 10A to 10C show examples of the invention for converting the image data shown in FIGS. 9A and 9B, in particular showing a converting process to be implemented for a white pixel (non-recording pixel) surrounded by black pixels (recording pixels). In the figures, 'A' represent the image information of 600 dpi, inputted from the host computer.

The image information 'A' of 600 dpi, shown in FIG. 10A, inputted from the host computer, in which the recording pixel on the left edge is designated as an observed pixel, has one or more black pixels on the MSD side of the observed pixel and one white pixel on the LSD side of the observed pixel followed by at least two dots of black pixels after the white pixel on the LSD side. In this condition, the observed pixel is subjected to the following converting process. The black pixels other than this observed pixel are converted in the manner as described in the first embodiment.

When the image information shown in 'A' of FIG. 10A is stored into shift register 220, comparing circuit 222 compares it with the reference patterns stored in comparing pattern storage 221. In this case, one line (row) shown in FIG. 9B is stored in comparing pattern storage 221. Therefore, comparing circuit 222 searches for a reference pattern which matches the content stored in shift register 220, and retrieves the matching pattern from the search result. As the matching pattern is recognized from the search, comparing circuit 222 sends the retrieved pattern to pattern outputting portion 223, which in turn outputs recording data (a sub-pixel pattern of data) consisting of three parts, or three white, black and white sub-pixels as shown in 'B' in FIG. 10A.

The black pixels other than the observed pixel are converted into recording data of three black, white and black sub-pixels and successively outputted. This state is shown in 'C'. Recording is implemented based on this output, so that reproduction and recording is performed in a recording pattern schematically shown in 'D'.

As is understood from this figure, lines as well as dots which are surrounded by black pixels can be prevented from being thinned and hence being eliminated. In particular, when black pixels as the observed pixels are converted and the converted data is supplied to and recorded by laser exposure unit 225, the white pixels can be recorded clearly. In this way, it becomes possible to create clear reproduction of white lines as well as halftones, etc.

FIG. 10B shows a case where in the image information of 600 dpi shown in 'A', inputted from the host computer, the recording (black pixel) on the left of the white pixel, or the recording pixel forming the left edge is designated as the observed pixel. More specifically, this is the case where a white pixel resides on the MSD side of a black pixel as the observed pixel with at least two dots of black pixels existing on the MSD side of the white pixel while one or more dots of black pixels exist on the LSD side of the observed pixel. This data set is the same as in FIG. 10A except in that the observed pixel is different.

In this case, as explained with reference to FIG. 10A, comparing circuit 222 compares the content temporarily stored in shift register 220 with the reference patterns to search for a matching pattern and sends the retrieved matching pattern to pattern outputting portion 223, where the observed pixel is converted into sub-pixel recording data consisting of three white, black and white sub-pixels as shown in 'B'. Thus, the black pixel area of the observed pixel is outputted as a sub-pixel pattern of white, black and white sub-pixels as shown in 'C' in FIG. 10B. No match with the reference patterns will be found for the other black pixels, so that these pixels are converted into a sub-pixel pattern of three black, white and black sub-pixels as already described in the first embodiment and the converted pattern is outputted for recording.

Accordingly, also in the case of FIG. 10B, it is possible to prevent white pixels surrounded by black pixels from being thinned, as shown in 'D' which schematically represents the actual recording state. Particularly, when black pixels adjoining white pixels are converted as the observed pixels, and the converted data is supplied to and recorded by laser exposure unit 225, the white pixels can be recorded clearly, without being filled up with black pixels. In this way, it becomes possible to create clear reproduction of white lines (in the row direction), halftones, etc.

FIG. 10C shows a scheme which is the combination of those in FIGS. 10A and 10B. In this example, it is also possible to prevent white pixels surrounded by black pixels from being thinned and hence implement recording of clear white pixels, thus making it possible to reproduce clear white lines and halftones.

In the schemes shown in FIGS. 10A through 10C, any one of smoothing processes is implemented in accordance with the selection instructed by the operator as described above. Specifically, when the image data shown in FIGS. 9A and 9B is reproduced, any one of the processes, FIGS. 10A through 10C, will be implemented for the white line or white pixel, by designating one from either the left-side processing, the right-side processing or the combination of them both.

Figure 11A:
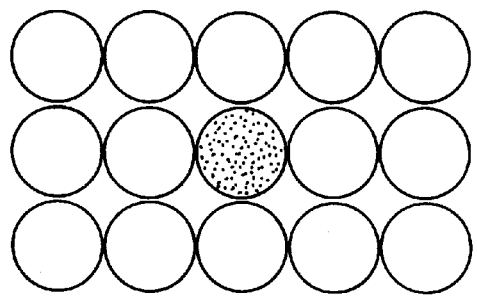
FIGS. 11A and 11B are charts showing image data which is a reversal of that shown in FIGS. 9A and 9B.
Figure 11B:
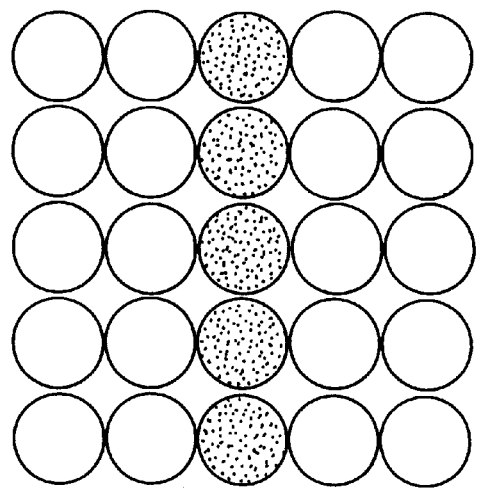

FIGS. 11A and 11B show the states where image data that is the opposite of that shown in FIGS. 9A and 9B, is given. In these cases, the black pixels may be eliminated or become too thinned to be recognized. In the case of FIG. 11A where a black pixel is surrounded by white pixels, the black pixel at the center may be eliminated by the reproduction of white pixels. Briefly, the pattern is reduced to a white solid pattern with no visible black pixel at the center. As a result, the reproduction of halftones etc., will be markedly degraded. FIG. 11B shows an image of a black line of pixels. In this case, the line of black pixels may become thin or incognizable because of failure to be reproduced.

For the image data stated above, a reference pattern consisting of white, white, black, white and white pixels is stored in comparing pattern storage 221. When image information of 600 dpi shown in FIG. 12 'A' is inputted from the host computer and stored into shift register 220, comparing circuit 222 will search for a reference pattern matching the pattern in the register.

Figure 12:
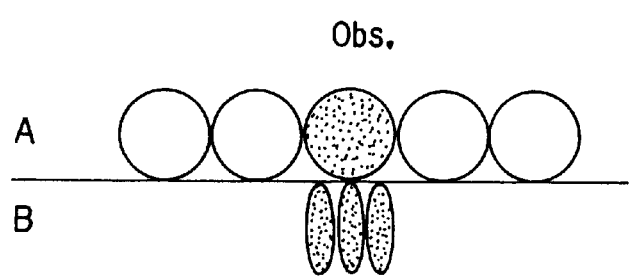
FIG. 12 is a chart showing a converting process when an input is found to match the reference pattern shown in FIGS. 11A and 11B, wherein the input image data and conversion processed data are represented.

In particular, in FIG. 12, for the recording (black) pixel as the observed pixel, two or more dots of white pixels exist on the MSD side and two or more dots of white pixels exist on the LSD side of the observed pixel. Therefore, this state occurs when a ruled line or a halftone image is reproduced. When the image data of this type is inputted to shift register 220 as stated above, comparing circuit 222 searches for the identical pattern. The matching pattern thus retrieved is sent to pattern outputting portion 223, which in turn outputs a sub-pixel pattern of data which composed of three black sub-pixels as shown in FIG. 12 'B'.

In this case, when the conversion described in the first embodiment is implemented for the observed pixel (black pixel) in FIG. 12, the image data of 600 dpi is converted into black, white and black sub-pixels of 1800 dpi. On the other hand, when comparing circuit 222 recognizes a match with the reference pattern, the black pixel is converted into black, black and black sub-pixels. In this way, it is possible to prevent a black pixel surrounded by white pixels from being thinned, to record the black pixel clearly, thus making it possible to reproduce ruled lines and halftone images more clearly.

As has been seen with reference to the embodiments, according to the invention, in the first embodiment, when the observed pixel is black, it is converted into three sub-pixels consisting of black sub-pixels at both sides of a white sub-pixel in between. When an observed pixel meets the condition of a particular reference pattern which has been previously determined, the recording data of three sub-pixels in accordance with the reference pattern is used to reproduce the observed pixel. These three sub-pixels are formed by dividing one pixel into three parts in the main scan direction of the laser beam but are not formed by dividing it in the auxiliary scan direction. Accordingly, this method can be achieved by a markedly simple circuit configuration without needing a storage of high memory capacity. Specifically, what is needed is to add a three-divided signal of the original clock for driving the semiconductor laser, a simple comparator and a storage for reference patterns etc., to the whole configuration.

Although in the embodiments of the invention, a 3x-resolution dividing process was exemplified, a dividing process of dividing a single pixel into a higher number of sub-pixels can be used. For example, when a 4x-resolution dividing process is adopted, both sides are outputted as recording data while at least one of the two sub-pixels in the center may be selectively processed as recording data. When a five-dividing process is adopted, a pattern output can be produced so that the sub-pixels on both sides and at the center are to be recording data.

In the image forming apparatus in accordance with the invention, without needing complicated configuration or control, it is possible to reduce practical dot spacing in slanted image elements and hence practically improve the resolution of the input image information, eliminating jaggies etc.

In the invention, since N-division (N>3) process is implemented only along the main scan direction of the light beam, only the division of the clock by N is needed for converting the practical resolution. Therefore, it is possible to reduce the storage and extra components as compared to the conventional configuration.

Further, jaggies at image edges can be eliminated by replacing the input image information by a specific pattern of a predetermined number of sub-pixels.

Finally, by replacing the input image information by a specific pattern of a predetermined number of sub-pixels, it is also possible to prevent isolated white or black pixels from being eliminated or thinned and hence improve the reproduction of ruled lines as well as halftones.

What is claimed is:

1. An image forming apparatus for reproducing an image on a recording medium in accordance with input image information by selective irradiation with light beams in accordance with the input image information, comprising:
   a resolution converting means which, when at least an observed pixel as a recording target is black, converts the resolution of the image into N-times (N is an integer greater than or equal to 3) only in a main scan direction of the light beam; and
   means for radiating light beams so that at least both sides of a center of an N-divided sub-pixel which was created by N-dividing the observed pixel by the resolution converting means, are outputted as black dots,
   wherein the center of the N-divided sub-pixel is outputted as at least one black dot when two or more pixels in a row adjoining the observed pixel on both sides thereof are white, and
   wherein the center of the N-divided sub-pixel is outputted as at least one white dot when at least one of two pixels in the row adjoining the observed pixel on at least one side thereof is black.

2. The image forming apparatus according to claim 1, wherein the resolution of the image is converted from 600 dpi to 1800 dpi.

3. An image forming apparatus comprising:
   a first storage means for holding a prescribed number of pixels of input image information, in a sequentially shifting manner,
       wherein the input image information is divided into N-times (N is an integer greater than or equal to 3);
   a second storage means which previously has had stored a plurality of reference patterns to be used for identifying a pattern of the image information held in the first storage means;
   a comparing circuit for comparing the image information held in the first storage means with the reference patterns stored in the second storage means to identify the pattern of the image information in the first storage means;
   outputting means which previously has had stored a plurality of sub-pixel patterns having N-times the original image resolution for an observed pixel as a recording target, and outputting one specific sub-pixel pattern in accordance with the input image information in the first storage means, based on a comparison result in the comparing circuit; and
   beam controlling means for controlling beam exposure in accordance with the sub-pixel pattern information outputted from the outputting means,
   wherein the outputting means outputs a sub-pixel pattern having a white sub-pixel at a center of the divided pixel, when in the image information held in the first storage means, the observed pixel as the recording target is black and at least one of two pixels in a row adjoining the observed pixel on at least one side thereof is black, and
   wherein the outputting means outputs a sub-pixel pattern having a black sub-pixel at least at the center of the divided pixel, when in the image information held in the first storage means, the observed pixel as the recording target is black and two or more pixels in a row adjoining the observed black pixel on one side thereof are black and two or more pixels in a row adjoining the observed black pixel on the other side thereof are white.

4. The image forming apparatus according to claim 3, wherein the outputting means outputs a sub-pixel pattern having at least two black sub-pixels on a right side, when in the image information held in the first storage means, the observed pixel as the recording target is white and two or more pixels in a row adjoining the observed black pixel on one side thereof are black and two or more pixels in a row adjoining the recording pixel on the other side thereof are white.

5. The image forming apparatus according to claim 4, wherein the process of replacing the observed pixel into a sub-pixel pattern is implemented in accordance with pixel division instructions given by an operator.

6. The image forming apparatus according to claim 3, wherein the process of replacing the observed pixel into a sub-pixel pattern is implemented in accordance with pixel division instructions given by an operator.

7. The image forming apparatus according to claim 3, wherein, when in the image information held in the first storage means, the observed pixel as the recording target is black and one or more black pixels adjoining the observed black pixel on one side thereof and one or more white pixels and two black pixels in a row adjoining the observed pixel on the other side thereof, the outputting means outputs a sub-pixel pattern having only a black sub-pixel at the center of the sub-pixels for the observed pixel, or outputs a sub-pixel pattern having only a black sub-pixel at the center for the black observed pixel as the recording target as well as at least nearest black pixel of the two black pixels adjoining the white pixel.

8. The image forming apparatus according to claim 3, wherein the outputting means outputs a sub-pixel pattern with all black sub-pixels when in the image information held in the first storage means, the observed pixel as the recording target is black and two or more white pixels in a row adjoining the observed black pixel on one side thereof and two or more white pixels in a row adjoining the black pixel on the other side thereof.

* * * * *